US011811460B2

(12) United States Patent
Razzell et al.

(10) Patent No.: US 11,811,460 B2
(45) Date of Patent: *Nov. 7, 2023

(54) ANALOG COHERENT SIGNAL PROCESSING SYSTEMS AND METHODS

(71) Applicant: Maxim Integrated Products, Inc., San Jose, CA (US)

(72) Inventors: Charles Razzell, Pleasanton, CA (US); Edem Ibragimov, Santa Clara, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,575

(22) Filed: Jan. 20, 2022

(65) Prior Publication Data

US 2022/0149955 A1    May 12, 2022

Related U.S. Application Data

(63) Continuation of application No. 17/080,188, filed on Oct. 26, 2020, now Pat. No. 11,233,574.

(60) Provisional application No. 62/931,122, filed on Nov. 5, 2019.

(51) Int. Cl.
*H04B 10/61*    (2013.01)

(52) U.S. Cl.
CPC ............................. *H04B 10/6162* (2013.01)

(58) Field of Classification Search
CPC .................................................. H04B 10/6162
USPC .................................................... 398/205
See application file for complete search history.

(56) References Cited

U.S. PATENT DOCUMENTS

| 11,233,574 | B2 * | 1/2022 | Razzell | H04B 10/6162 |
| 11,283,528 | B2 * | 3/2022 | Masuda | G02F 2/00 |
| 2014/0328585 | A1 * | 11/2014 | Arikawa | H04B 10/6162 |
| | | | | 398/208 |
| 2020/0328818 | A1 * | 10/2020 | Razzell | H04B 10/614 |

\* cited by examiner

*Primary Examiner* — Mohammad R Sedighian (74) *Attorney, Agent, or Firm* — North Weber & Baugh LLP; Michael North (57) ABSTRACT

Real-time systems and methods prevent duplication of independent signal streams in a coherent receiver subject to source separation controlled by multiplicative coefficients under adaptive feedback control. In various embodiments, this is achieved by first obtaining a first set of coefficients associated with a first signal stream and a second set of coefficients associated with a second signal stream. In response to the sets of coefficients satisfying a condition, the first set modified into a set of coefficients that is mutually orthogonal with respect to and replaces the second set of coefficients. The resulting series of coefficient values may then be used to perform source separation of independent signal streams without duplicating independent signal streams.

20 Claims, 7 Drawing Sheets

ANALOG COHERENT SIGNAL PROCESSING SYSTEMS AND METHODS

CROSS REFERENCE TO RELATED PATENT APPLICATIONS

The present application is a continuation of and claims priority benefit, under 35 U.S.C. § 120, to co-pending and commonly-assigned U.S. patent application Ser. No. 17/080,188, entitled "Analog Coherent Signal Processing Systems and Methods", filed on Oct. 26, 2020, listing as inventors Charles Razzell and Edem Ibragimov, and it claims priority, under 35 U.S.C. § 119(e), to the U.S. Provisional Patent Application Ser. No. 62/931,122 entitled "Analog Coherent Signal Processing Systems and Methods", filed on Nov. 5, 2019, listing as inventors Charles Razzell and Edem Ibragimov. Each reference mentioned in this patent document is incorporated by reference herein in its entirety and for all purposes.

BACKGROUND

The present disclosure relates generally to signal processing in high-speed communication circuits. More particularly, the present disclosure relates to preventing unwanted signal duplication in high-speed coherent receivers.

In the past few decades, telecommunication networks have seen an ever-increasing demand for bandwidth. Large available bandwidth is a major factor in the increasing popularity of high-speed optical communication systems—whether for transferring data chip-to-chip or between Wide Area Network (WAN) fiber-optic links. For example, optical transceivers designed for short-distance (few hundred meters) interconnects over optical fiber are in high demand in data center and campus networks.

Coherent optical links communicate data over different channels that correspond to different phases and/or polarizations of an input signal to the optical fiber. While transmitted data typically are aligned relative to a common clock, delays are introduced into the channels due to inherent characteristics of the transmitter, receiver, and optical fiber, such that polarization and phase in the various channels arrives at the receiver with unknown phase rotation in phase a polarization dimensions, which are inverted to recover the transmitted data. In certain designs, misconvergence in electronic polarization control loops may further cause an unwanted duplication of polarization signals.

Accordingly, it is desirable to provide improved coherent signal processing systems and methods that overcome the shortcomings of existing approaches.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. For example, it is understood that analog circuits and components may equally be implemented as digital or mixed-signal circuitry. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

Any headings used herein are for organizational purposes only and shall not be used to limit the scope of the description or the claims. All documents cited herein are incorporated by reference herein in their entirety.

A. Overview

Figure 1:
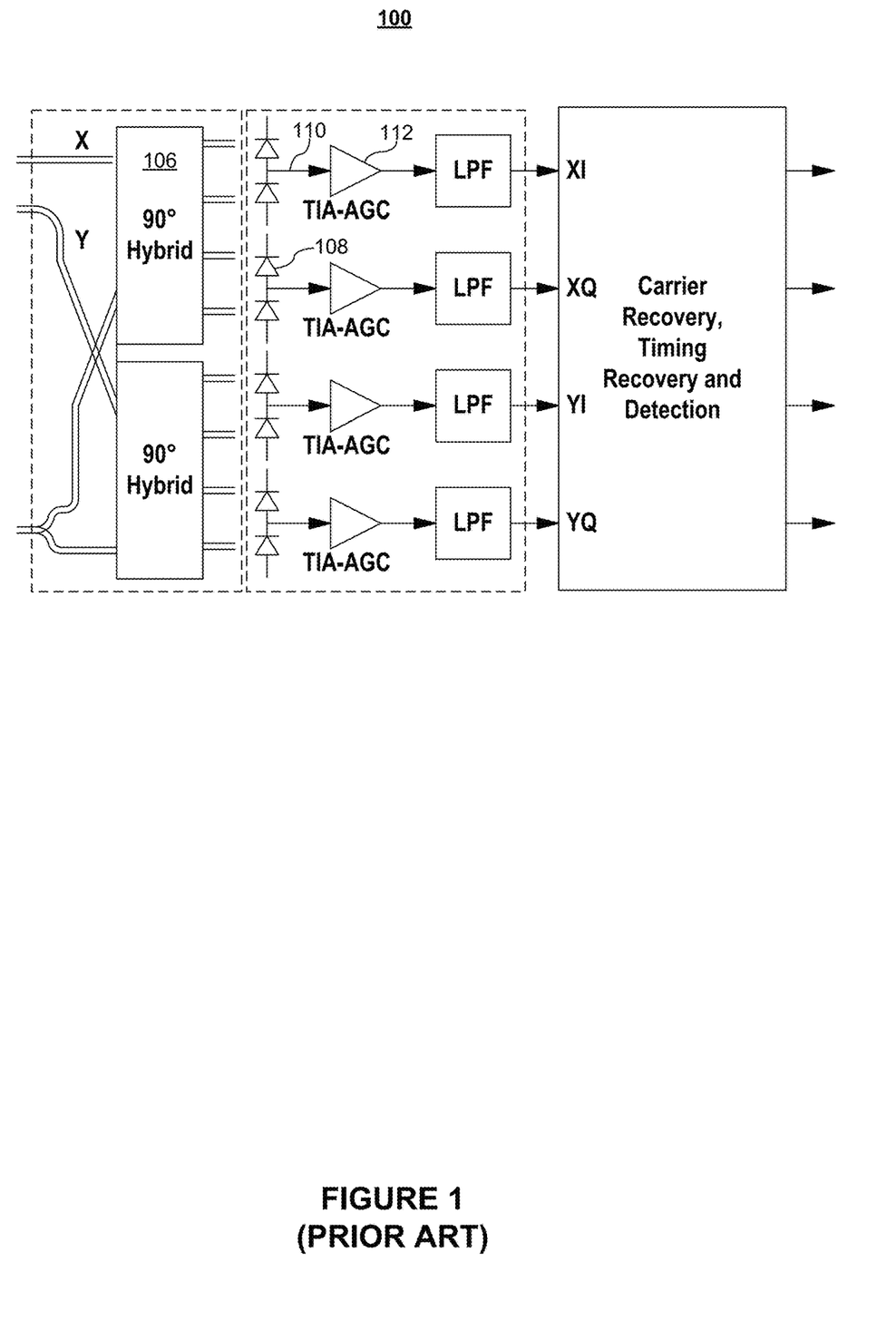
FIG. 1 is a block diagram of a conventional dual polarization quaternary amplitude modulation (DP-QAM) receiver architecture that is based on analog signal processing.

FIG. 1 is a block diagram of a conventional DP-QAM receiver architecture that is based on analog signal processing. Receiver 100 is a homodyne receiver driven by an on-channel laser (not shown) that acts as the local oscillator. The arrangement of the polarization beam splitter and 90° hybrids 106 is designed to provide balanced quadrature light outputs for each of the two orthogonal polarizations, conventionally labeled X and Y, which are incident on eight photodiodes 108 that are arranged in balanced pairs. This arrangement results in four bipolar photocurrents 110 that are amplified by respective Trans Impedance Amplifiers (TIAs) 112, corresponding to in-phase (I) and quadrature (Q)-phases of the X- and Y-polarizations, respectively. Thus, four branches of receiver 100, i.e., XI, XQ, YI, YQ, are available for further signal processing in the analog domain.

Existing electronic polarization control loops are useful to separate and phase-align the dual polarization coherent signals. Least mean square (LMS) adaption is performed using a continuous version of the classic RLMS update equation on eight coefficients held, for example, in analog integrators as charge on capacitors. Eight coefficients represent a 2×2 complex matrix that is used to separate and phase correct the incoming analog signal:

$$\begin{bmatrix} E_{XO} \\ E_{YO} \end{bmatrix} = \begin{bmatrix} C_{1X} & C_{1Y} \\ C_{2X} & C_{2Y} \end{bmatrix} \cdot \begin{bmatrix} E_{XI} \\ E_{YI} \end{bmatrix}$$

In some approaches, since all four coefficients of the complex matrix are independently adapted according to a local error metric, there is nothing to prevent the convergence matrix from collapsing to a one-dimensional solution:

$$\begin{bmatrix} E_{XO} \\ E_{XO} \end{bmatrix} = \begin{bmatrix} C_{1X} & C_{1Y} \\ C_{1X} & C_{1Y} \end{bmatrix} \cdot \begin{bmatrix} E_{XI} \\ E_{YI} \end{bmatrix} \text{ or } \begin{bmatrix} E_{YO} \\ E_{YO} \end{bmatrix} = \begin{bmatrix} C_{2X} & C_{2Y} \\ C_{2X} & C_{2Y} \end{bmatrix} \cdot \begin{bmatrix} E_{XI} \\ E_{YI} \end{bmatrix}$$

Figure 2:
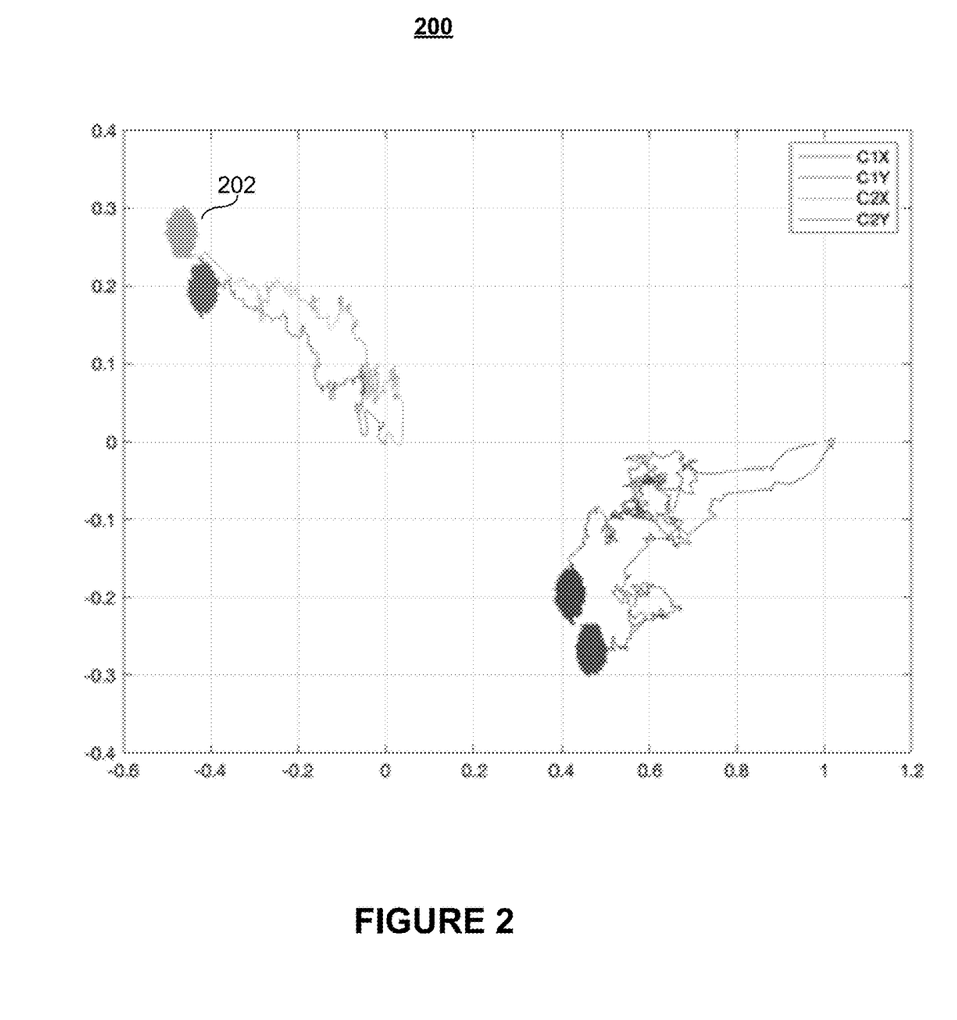
FIG. 2 is a convergence trace plot of simulated results that illustrate duplication of polarization signals that can arise in receivers.

These degenerate matrices result in the duplication of one of the polarization signals, while the other polarization signal is discarded. FIG. 2 is a convergence trace plot of simulated results that illustrate duplication of polarization signals that can arise in receivers, such as DP-QAM receiver 100 shown in FIG. 1. As depicted, four constellation points 202, in effect, collapse to only two constellation points. Accordingly, it would be desirable to have systems and methods that provide real-time analog coherent signal processing that overcomes this duplication issue.

B. Top Level View

Figure 3:
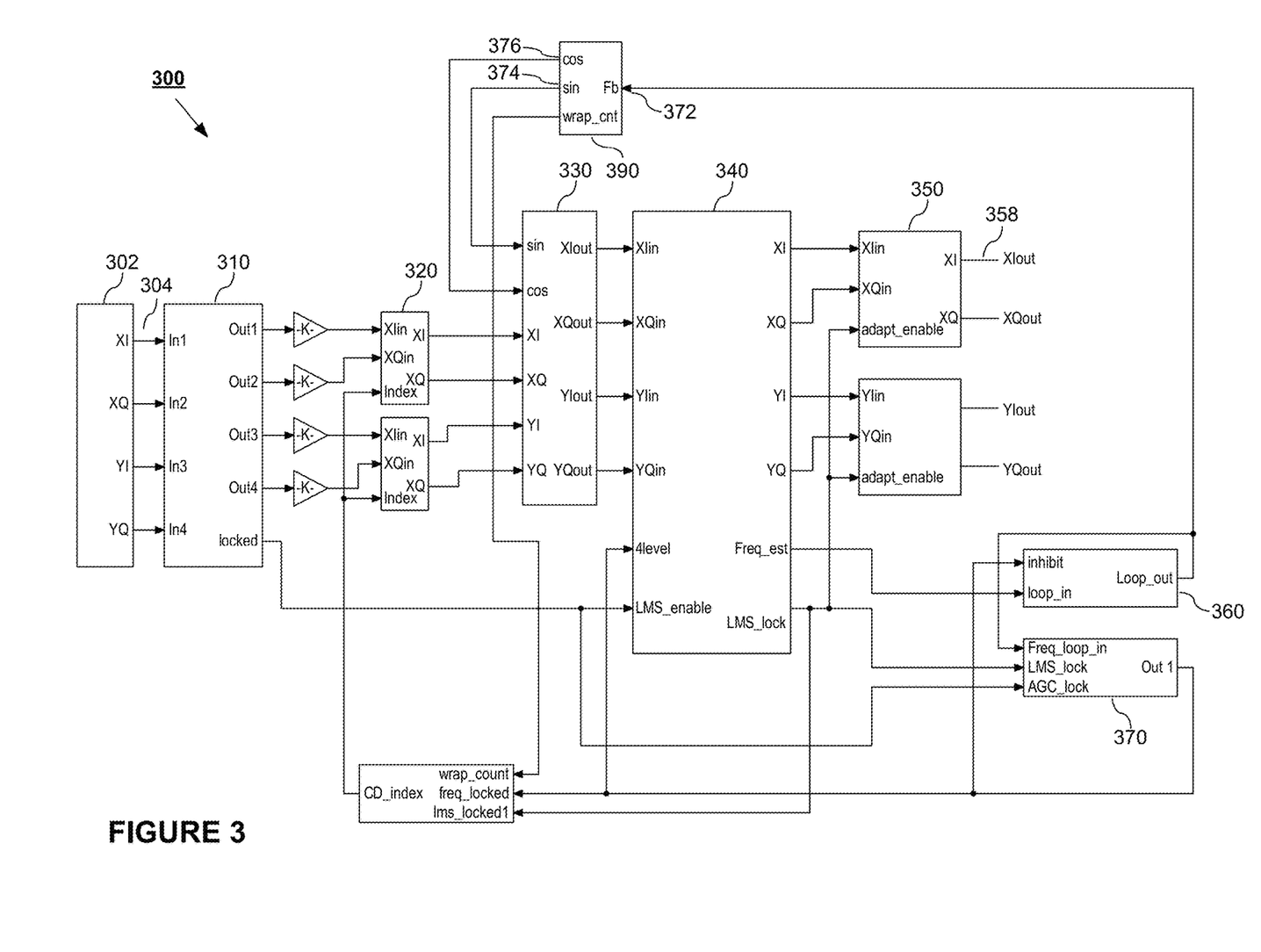
FIG. 3 illustrates a top level view of an exemplary analog coherent signal processing engine (ACE) for dual-polarization 16-quadrature amplitude modulation (16-QAM) links, according to various embodiments of the present disclosure.

FIG. 3 illustrates a top level view of an exemplary analog coherent signal processing engine (ACE) for dual-polarization 16-QAM links, according to various embodiments of the present disclosure. ACE 300 comprises receiver input 302, automatic gain control (AGC) 310, front end equalizer (FEE) 320, carrier frequency offset (CFO) 330, polarization and carrier phase correction circuit 340, back-end equalizer (BEE) 350, Frequency sweep generator 360, AFC lock detect circuit 370, and digitally controlled oscillator (DCO) 390.

In embodiments, receiver input 302 receives four electrical signals that represent respective receiver branches 304 XI, XQ, YI, and YQ that may be the outputs of differential TIAs that, similar to FIG. 1, monitor four pairs of photodiodes (not shown in FIG. 3). AGC 310 may be a 4-channel AGC that normalizes signal levels for further processing. Automatic gain control may be performed independently in each receiver branch (e.g., 304) using a control loop that strives to achieve a set point for the RMS output voltage. An AGC lock detect signal may be provided as the "AND" of the lock detects for all four receiver branches (e.g., 304). Further, deglitching logic may be utilized to prevent multiple lock/unlock events during the final stages of loop settling.

In embodiments, FEE 320 may be used to reduce or eliminate CD, ISI, and receiver skew. FEE 320 may be implemented as an analog FEE, e.g., one for X and one for Y, that utilizes a set of tap weights to cause down-stream receiver loops to lock correctly. Tap weights may be set using a look-up table that specifies a set of suitable FIR coefficients. In embodiments, four independently determined coefficient vectors may be used instead of two, which normally suffices for complex coefficients.

In embodiments, CFO 330 correction or cancellation multiplies respective X- and Y-branches with a complex local oscillator signal provided on sin 374 and cos 374 input ports. In embodiments, BEE 350 may use a pulse amplitude modulation 4 level (PAM4) decision-based error signal to train an iterative analog complex LMS with five complex taps. BEE 350 perform residual ISI correction by inverse filtering the low-pass filtering effect caused by amplifier parasitics. In embodiments, BEE 350 correct for loss of fidelity by adaptively finding the transfer function that results in the least error between the PAM4 signal points. A gain block in the error feedback loop (not shown) may be used to adjust the speed of adaption. The output of BEE 350 are corrected PAM4 signals that may be fed into an ADC (not shown) to obtain desired symbols.

In embodiments, various circuit elements may provide control and/or supervisory functions for loop control. For example, DCO 390 may generate a quadrature local oscillator having a frequency defined by the output of a loop filter (not shown) that operates on the control loop feedback signal at input port "Fb" 372. The integrator within the loop filter may be programmed to wrap once it reaches either extreme of a frequency offset range, such as to allow for continuous linear ramp scanning of possible offset frequencies between transmitter and receiver lasers. Once the loop filter state wraps around from positive to negative frequency offsets or vice versa, a counter may be incremented and provided on an output port. Once the counter is incremented, the chromatic dispersion (CD) compensation range may be incremented in several km steps to find a CD compensation value that enables a frequency lock.

AFC lock detect circuit 370 may indicate that the frequency is in lockable range, e.g., by monitoring the control loop of CFO 330 and determining when the rate of change of frequency crosses a zero value. Circuit 370 may further indicate that the continuous scanning of possible offset frequencies should be suspended for a predetermined time. Logic may be provided to prevent the an indication of a stable frequency loop from being asserted too soon after AGC 310 has locked to prevent a premature frequency lock determination. If LMS loop lock detect is true, this may override the frequency lock detection function since LMS loop cannot achieve phase lock unless frequency lock has already been achieved. This allows the monostable to expire without any impact to the status of frequency lock, thereby allowing the LMS loop to achieve lock during the monostable time period.

In embodiments, frequency sweep generator 360 controls frequency sweeps, e.g., by combining the output of the LMS frequency offset detector with an internally generated constant signal that biases the control loop feedback signal, e.g., to enable wide-band frequency offset scanning at power-up or after frequency lock has been lost. Polarization and carrier phase correction circuit 340 is described next with reference to FIG. 4.

Figure 4:
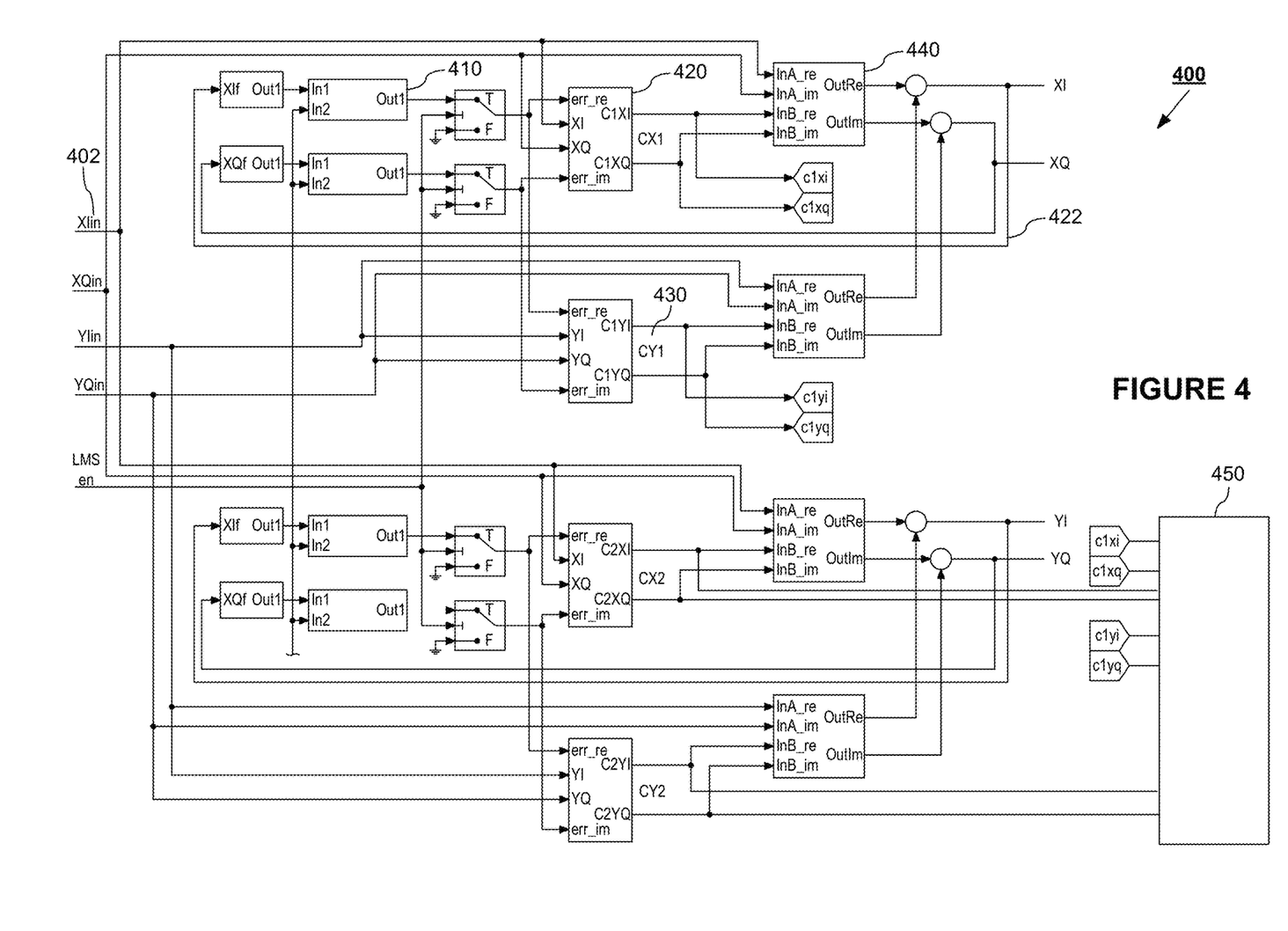
FIG. 4 illustrates an exemplary polarization and carrier phase correction circuit, according to embodiments of the present disclosure.

FIG. 4 illustrates an exemplary polarization and carrier phase correction circuit, according to embodiments of the present disclosure. Polarization and carrier phase correction circuit 400 comprises error slicers (e.g., 410), adaption circuits (e.g., 420), complex multipliers (e.g., 440), and supervisory control circuit 450. At the top level, circuit 400 may be viewed as four complex multipliers (e.g., 440) that are representative of the Jones matrix. The multipliers multiply a time-varying 2×2 complex matrix by four input signals (e.g., 402) that each may be viewed as two complex signals, where the complex tap weights may be continuously adapted by using the LMS update equation to correct for the polarization and phase rotations in the optical channel.

In embodiments, adaption of the complex coefficients (e.g., 430) may be implemented by one analog LMS loop (e.g., 422) for each coefficient (e.g., 430). In embodiments, to correct for polarization and phase changes in the fiber, four real error slicers 410 monitor and compare the error, which may be a time-varying signal, to an ideal constellation and, based on the comparison, drive four complex adaption circuits (e.g., 420) that determine four complex coefficients (e.g., 430) for the Jones matrix. Supervisory control circuit 450 may be implemented by unitary forcer circuit 450 discussed in greater detail below with reference to FIG. 5.

1. Mathematical Description

Considering a dual-polarization coherent optical receiver having four independent branches, XI, XQ, YI, and YQ, that represent the I and Q components of two arbitrary orthogonal polarizations X and Y, and neglecting losses and dispersion in the optical channel, the observed X and Y signals in the receiver branches may be represented in complex notation as $$\begin{bmatrix} X_{in} \\ Y_{in} \end{bmatrix} = e^{i\psi/2} \begin{bmatrix} e^{i\phi_1/2} & 0 \\ 0 & e^{-i\phi_1/2} \end{bmatrix} \begin{bmatrix} \cos\theta & \sin\theta \\ -\sin\theta & \cos\theta \end{bmatrix} \begin{bmatrix} e^{i\phi_0/2} & 0 \\ 0 & e^{-i\phi_0/2} \end{bmatrix} \begin{bmatrix} E_{xi} \\ E_{yi} \end{bmatrix},$$

where $\psi$, $\phi_1$, $\theta$ and $\phi_0$ are four real parameters, $\psi$ represents the absolute phase, $\phi_0$ represents relative phase shift between X- and Y-polarization signals before a plane polarization rotation by $\theta$, and $\phi_1$ represents the relative phase shift afterwards. By multiplying all of these sub-components, a single 2×2 complex matrix is obtained that relates the received signal to the transmitted signal as follows:

$$\begin{bmatrix} X_{in} \\ Y_{in} \end{bmatrix} = \begin{bmatrix} \Gamma_{1X} & \Gamma_{1Y} \\ \Gamma_{2X} & \Gamma_{2Y} \end{bmatrix} \begin{bmatrix} E_{xi} \\ E_{yi} \end{bmatrix},$$

The matrix $\Gamma$ is unitary due to the factors that used to create it. Matrix $\Gamma$ is therefore invertible, and an estimate of the original transmitted waveforms may be obtained as:

$$\begin{bmatrix} \hat{E}_{xi} \\ \hat{E}_{yi} \end{bmatrix} = \begin{bmatrix} \Gamma_{1X} & \Gamma_{1Y} \\ \Gamma_{2X} & \Gamma_{2Y} \end{bmatrix}^{-1} \begin{bmatrix} X_{in} \\ Y_{in} \end{bmatrix}.$$

Thus, there exists a new demixing matrix, $$C \stackrel{def}{=} \Gamma^{-1},$$

which may be substituted into the above matrix equation to yield:

$$\begin{bmatrix} X_{out} \\ Y_{out} \end{bmatrix} \stackrel{def}{=} \begin{bmatrix} \hat{E}_{xi} \\ \hat{E}_{yi} \end{bmatrix} = \begin{bmatrix} C_{1X} & C_{1Y} \\ C_{2X} & C_{2Y} \end{bmatrix} \begin{bmatrix} X_{in} \\ Y_{in} \end{bmatrix}.$$

This represents two linear equations, each having two complex coefficients, i.e., $$X_{out} = C_{1X} X_{in} + C_{1Y} Y_{in}$$

and $$Y_{out} = C_{2X} X_{in} + C_{2Y} Y_{in}.$$

Although these two equations look independent, they derive from only four independent real parameters and, hence, the coefficients on the top and bottom rows of the matrix are not independent from each other. Nevertheless, they may be treated as independent for the purposes of iterating towards a solution as long as they do not converge in a manner such that the top and bottom rows are related to each other by a proportionality constant, i.e., $X_{out}=\alpha Y_{out}$, where $\alpha$ is the proportionality constant.

Solving one of these equations (and assuming that a similar technique may be applied to the other similar equation) provides $X_{out}=C_{1X}X_{in}+C_{1Y}Y_{in}$, in which only the observed signals $X_{in}$ and $Y_{in}$ are known. Although the estimated symbol $\hat{E}_{xi}=X_{out}$ is unknown, it is known that ideal samples of $X_{out}$ should be drawn from the finite alphabet of the modulation constellation in use, e.g., 16-QAM. Hence, for any candidate trial values of $C_{1X}$ and $C_{1Y}$, the error may be estimated as the difference between the nearest valid constellation point and $X_{out}$, denoted by $Q(X_{out})$ and $X_{out}$. Let $$e(X_{out}) \stackrel{def}{=} Q(X_{out}) - X_{out}.$$

The quantizer, Q, may be defined as two PAM4 modulation quantizers that operate, at least approximately, independently in the I- and Q-dimensions.

Based on the known complex LMS update equation, one may iterate towards a minimum error condition by accumulating into coefficients $C_{1X}$ and $C_{1Y}$ using the following update equations:

$$C_{1X} \Leftarrow C_{1X} + \mu(Q(X_{out}) - X_{out}) \cdot X_{in}^*$$

$$C_{1Y} \Leftarrow C_{1Y} + \mu(Q(X_{out}) - X_{out}) \cdot Y_{in}^*$$

$$X_{out} = X_{in} \cdot C_{1X} + Y_{in} C_{1Y}$$

Expanding the above complex expressions using:

$$X_{out} \stackrel{def}{=} X_{Iout} + iX_{Qout}; C_{1X} \stackrel{def}{=} C_{1XI} + iC_{1XQ}; C_{1Y} \stackrel{def}{=} C_{1YI} + iC_{1YQ};$$

$$C_{2X} \stackrel{def}{=} C_{2XI} + iC_{2XQ}; C_{2Y} \stackrel{def}{=} C_{2YI} + iC_{2YQ}$$

yields for computation of the output for real and imaginary parts of the X-polarization output:

$$X_{Iout} = X_{I_{in}} \cdot C_{1XI} - X_{Qin} \cdot C_{1XQ} + Y_{I_{in}} \cdot C_{1YI} - Y_{Qin} \cdot C_{1YQ}$$

$$X_{Qout} = X_{Qin} \cdot C_{1XI} + X_{I_{in}} \cdot C_{1XQ} + Y_{Qin} \cdot C_{1YI} + Y_{I_{in}} \cdot C_{1YQ}.$$

The coefficient update equations for the real and imaginary parts of upper row of the coefficient matrix are then:

$$C_{1XI} \Leftarrow C_{1XI} + \mu(Q(X_{Iout}) - X_{Iout}) \cdot X_{I_{in}} + \mu(Q(X_{Qout}) - X_{Qout}) \cdot X_{Q_{in}}$$

$$C_{1XQ} \Leftarrow C_{1XQ} + \mu(Q(X_{Qout}) - X_{Qout}) \cdot X_{I_{in}} - \mu(Q(X_{Iout}) - X_{Iout}) \cdot X_{Q_{in}}$$

$$C_{1YI} \Leftarrow C_{1YI} + \mu(Q(X_{Iout}) - X_{Iout}) \cdot Y_{I_{in}} + \mu(Q(X_{Qout}) - X_{Qout}) \cdot Y_{Q_{in}}$$

$$C_{1YQ} \Leftarrow C_{1YQ} + \mu(Q(X_{Qout}) - X_{Qout}) \cdot Y_{I_{in}} - \mu(Q(X_{Iout}) - X_{Iout}) \cdot Y_{Q_{in}}$$

Similarly, one may write for the Y-polarization output:

$$Y_{out} = X_{in} \cdot C_{2X} + Y_{in} C_{2Y},$$

which expands to:

$$Y_{Iout} = X_{I_{in}} \cdot C_{2XI} - X_{Qin} \cdot C_{2XQ} + Y_{I_{in}} \cdot C_{2YI} - Y_{Qin} \cdot C_{2YQ}$$

$$Y_{Qout} = X_{Qin} \cdot C_{2XI} + X_{I_{in}} \cdot C_{2XQ} + Y_{Qin} \cdot C_{2YI} + Y_{I_{in}} \cdot C_{2YQ}.$$

And the corresponding update equations are:

$$C_{2X} \Leftarrow C_{2X} + \mu(Q(Y_{out}) - Y_{out}) \cdot X_{in}^*$$

$$C_{2Y} \Leftarrow C_{2Y} + \mu(Q(Y_{out}) - Y_{out}) \cdot Y_{in}^*$$

which expand to:

$$C_{2XI} \Leftarrow C_{2XI} + \mu(Q(Y_{Iout}) - Y_{Iout}) \cdot X_{I_{in}} + \mu(Q(Y_{Qout}) - Y_{Qout}) \cdot X_{Q_{in}}$$

$$C_{2XQ} \Leftarrow C_{2XQ} + \mu(Q(Y_{Qout}) - Y_{Qout}) \cdot X_{I_{in}} - \mu(Q(Y_{Iout}) - Y_{Iout}) \cdot X_{Q_{in}}$$

$$C_{2YI} \Leftarrow C_{2YI} + \mu(Q(Y_{Iout}) - Y_{Iout}) \cdot Y_{I_{in}} + \mu(Q(Y_{Qout}) - Y_{Qout}) \cdot Y_{Q_{in}}$$

$$C_{2YQ} \Leftarrow C_{2YQ} + \mu(Q(Y_{Qout}) - Y_{Qout}) \cdot Y_{I_{in}} - \mu(Q(Y_{Iout}) - Y_{Iout}) \cdot Y_{Q_{in}}$$

The result is eight real-valued update equations that may be used to find the four complex coefficients of the demixing matrix. In embodiments of the present disclosure, these update equations may be implemented in the analog domain as continuous-time integrators.

a) Potential Simplification of LMS Update Equations

It is noted that each update equation maybe incremented by the sum of two products, according to a common standard complex LMS update equation. Some existing approaches neglect one of the above two products, which results in the following set of update equations:

$$C_{1XI} = C_{1XI} + \mu(Q(X_{Iout}) - X_{Iout}) \cdot X_{I_{in}} + \cancel{\mu(Q(X_{Qout}) - X_{Qout}) \cdot X_{Q_{in}}}$$

$$C_{1XQ} = C_{1XQ} + \cancel{\mu(Q(X_{Qout}) - X_{Qout}) \cdot X_{I_{in}}} - \mu(Q(X_{Iout}) - X_{Iout}) \cdot X_{Q_{in}}$$

$$C_{1YI} = C_{1YI} + \cancel{\mu(Q(X_{Iout}) - X_{Iout}) \cdot Y_{I_{in}}} + \mu(Q(X_{Qout}) - X_{Qout}) \cdot Y_{Q_{in}}$$

$$C_{1YQ} = C_{1YQ} + \mu(Q(X_{Qout}) - X_{Qout}) \cdot Y_{I_{in}} - \cancel{\mu(Q(X_{Iout}) - X_{Iout}) \cdot Y_{Q_{in}}}$$

etc.

Those deletions, combined with similar ones for the second pair of complex coefficients, yield the following eight update equations.

$$C_{1XI} = C_{1XI} + \mu(Q(X_{Iout}) - X_{Iout}) \cdot X_{I_{in}}$$

$$C_{1XQ} = C_{1XQ} - \mu(Q(X_{Iout}) - X_{Iout}) \cdot X_{Q_{in}}$$

$$C_{1YI} = C_{1YI} + \mu(Q(X_{Qout}) - X_{Qout}) \cdot Y_{Q_{in}}$$

$$C_{1YQ} = C_{1YQ} + \mu(Q(X_{Qout}) - X_{Qout}) \cdot Y_{I_{in}}$$

$$C_{2XI} = C_{2XI} + \mu(Q(Y_{Iout}) - Y_{Iout}) \cdot X_{I_{in}}$$

$$C_{2XQ} = C_{2XQ} - \mu(Q(Y_{Iout}) - Y_{Iout}) \cdot X_{Q_{in}}$$

$$C_{2YI} = C_{2YI} + \mu(Q(Y_{Qout}) - Y_{Qout}) \cdot Y_{Q_{in}}$$

$$C_{2YQ} = C_{2YQ} + \mu(Q(Y_{Qout}) - Y_{Qout}) \cdot Y_{I_{in}}$$

This results in saving one multiplication and one addition per complex tap compared to the conventional complex LMS update, at the cost of some adaption speed. The full set of equations relies on only four error terms, which are preferably computed only once each, hence the complexity reduction is indeed limited to one multiply and one add per coefficient.

These update equations are expressed in their discrete-time form, whereas the implementation should use continuous-time integrators of the terms on the R.H.S.

b) Preventing Identical Convergence in X- and Y-Polarization Branches

It is noted that convergence algorithms for the X- and Y-polarization branches may be identical. However, as previously mentioned, it would be desirable to prevent convergence on substantially the same solution that causes the coherent optical receiver to output the same polarization component of the signal, in effect, duplicating one polarization stream and discarding the other.

To a first order, one may use the initial conditions of the LMS state variables to discourage convergence to the same coefficients. In cases where the state of polarization (SOP) of the fiber channel causes X- and Y-signal energy to be distributed with significantly different weights between the receiver channels, using initial conditions that correspond to widely separated channels will in most cases cause a similarly divergent set of coefficients after adaption has completed. However, for an unknown initial SOP in the channel, there are cases where the such initial conditions are not close the final adapted state, giving rise to the possibility that the first successful convergence in the X- and Y-branches will be the same, subject to some constant scale factor. Unless some kind of remedial action is taken, this undesirable state of affairs may persist and cause loss of data, until a subsequent power-on reset.

By way of example, returning to the convergence plot in FIG. 2 of the four complex coefficients comprising the matrix C, the final values for the matrix C are:

$$C = \begin{bmatrix} 0.4669 - 0.2738i & -0.4057 + 0.2016i \\ -0.4669 + 0.2738i & 0.4057 - 0.2016i \end{bmatrix}.$$

It is noted that det(C)≈0, indicating that multiplication by matrix C is non-reversible, such that irretrievable loss of information would occur if matrix C were used as a demixing matrix in an attempt to separate the X- and Y-signal streams.

In addition, the correlation coefficient between the first and second rows of matrix C is unity (the scale factor is −1), indicating perfect correlation between the X- and Y-channels.

In order to monitor and correct for possible ill-formed convergence, various embodiments of the present disclosure monitor the correlation coefficient between the first and second rows of the coefficient matrix, e.g., using the following formula:

$$\rho^2 = \frac{(C1X.C2X^* + C1Y.C2Y^*)(C1X^*.C2X + C1Y^*.C2Y)}{(C1X.C1X^* + C1Y.C1Y^*)(C2X.C2X^* + C2Y.C2Y^*)}$$

In embodiments, in order to avoid the need for a division operation, one may take corrective action to restore orthogonality when the following is inequality is met:

$$(C1X \cdot C2X^* + C1Y \cdot C2Y^*) \cdot (C1X^* \cdot C2X + C1Y^* \cdot C2Y) > \rho_{tol}^2 (C1X \cdot C1X^* + C1Y \cdot C1Y^*) \cdot (C2X \cdot C2X^* + C2Y \cdot C2Y^*)$$

In embodiments, the corrective action to restore orthogonality comprises replacing the second row of the coefficient matrix with an orthogonalized copy of the first row. For example, let C2X=−C1Y* and C2Y=C1X*, then, the new correlation of the first and second rows becomes:

$$(C1X \cdot C2X^* + C1Y \cdot C2Y^*) = -C1X \cdot C1Y + C1Y \cdot C1X = 0.$$

Figure 5:
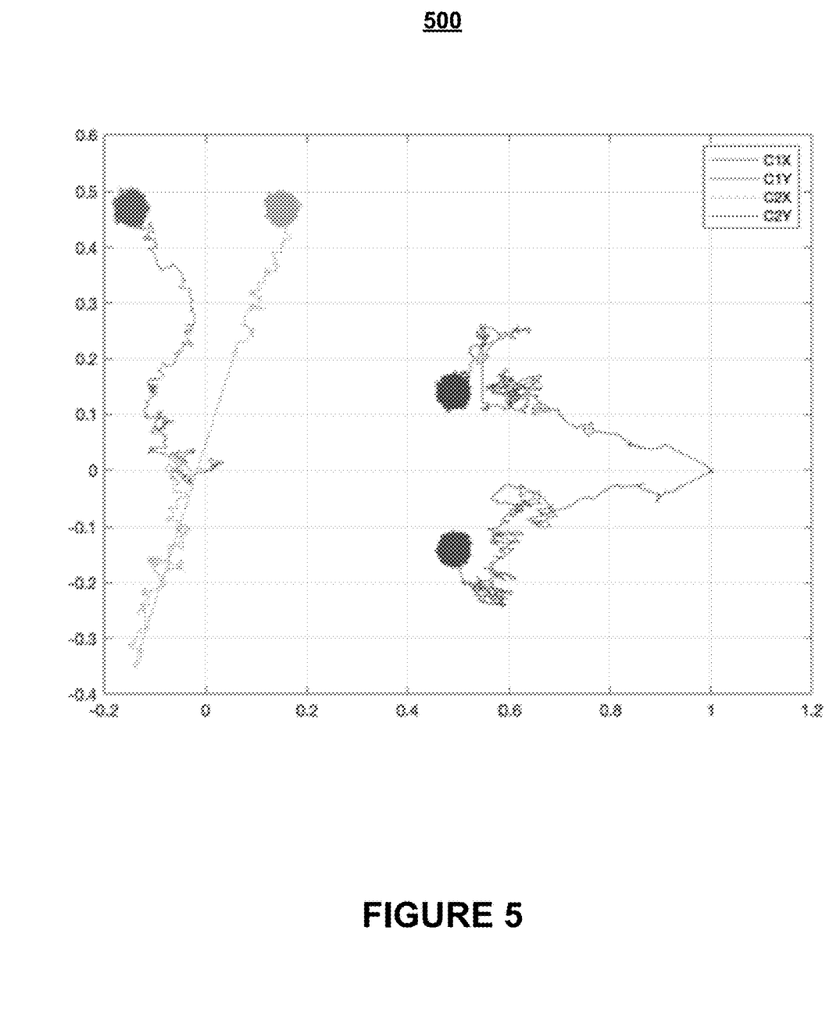
FIG. 5 is a convergence trace plot of a simulation that illustrates the results of a substitution according to various embodiments of the present disclosure.

After performing this substitution, convergence may be permitted to continue as normal. FIG. 5 is a convergence trace plot of a simulation that illustrates the results of a substitution according to various embodiments of the present disclosure. In embodiments, for example for reduced complexity, other correlation metrics may be considered but care should be exercised to control signal amplitude-dependence of the alarm threshold. The use of the full correlation coefficient to avoid that problem may come at a computational cost.

C. Unitary Forcer Circuit

Figure 6:
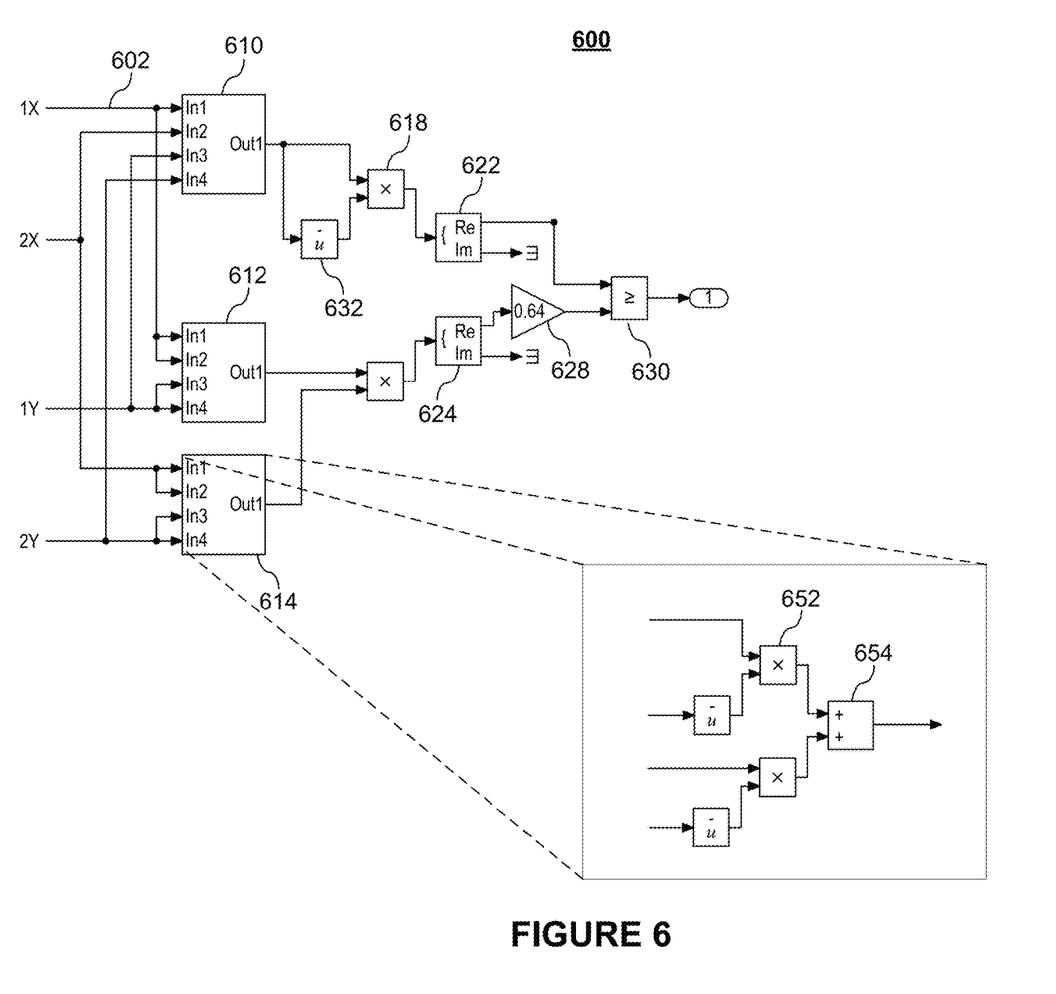
FIG. 6 illustrates an exemplary unitary forcer circuit and an exploded view of a sum-of-conjugate-product circuit according to embodiments of the present disclosure.

FIG. 6 illustrates an exemplary unitary forcer circuit and an exploded view of a sum-of-conjugate-product circuit according to embodiments of the present disclosure. Unitary forcer circuit 600 comprises sum-of-conjugate-product circuits (e.g., 610), multipliers (e.g., 618), comparators 628, 630, and inverter (e.g., 632). Sum-of-conjugate-product circuits 610-614 comprise multipliers (e.g., 652) and adder (e.g., 654).

In operation, sum-of-conjugate-product circuits 610-614 generate the sums of the following conjugate products. Circuit 610 generates sum C1X·C2X*+C1Y·C2Y*; circuit 612 generates sum C1X·C1X*+C1Y·C1Y*; and circuit 614 generates sum C2X·C2X*+C2Y·C2Y*.

In embodiments, unitary forcer circuit 600 prevents X- and Y-polarization control loops from selecting and extracting the same polarization component of a signal from an optical channel (either both converging to the X-component or both converging to the Y-component). An unwanted convergence produces a non-unitary Jones matrix or its inverse, which, in embodiments, are detected by a correlation coefficient computation involving two rows of the Jones matrix. In embodiments, in response to such a detection, a set of analog integrators that may define the state of the Jones matrix may be reset to unitary-compliant values. This may be accomplished by transforming the coefficient matrix, e.g., a complex time-varying demixing matrix to a nearest unitary matrix. In embodiments, the complex coefficient matrix may represent a 2×2 composite polarization and phase matrix that comprises two complex coefficients in each row. In embodiments, a transformation may comprise 1) reversing the order of the two complex numbers, 2) taking the conjugates of the two complex numbers to obtain two conjugated numbers, and negating one of the two conjugated numbers.

In embodiments, one row of the coefficient matrix is preserved and the other row is replaced such as to facilitate orthogonality and obtain a correction matrix. In embodiments, this correction matrix may be continuously updated, e.g., by a polarization control loop, and may be used to perform polarization and phase correction of analog output signals in X and Y polarization branches of a coherent receiver to prevent signal duplication.

In embodiments, unitary forcer circuit 600 estimates the numerator and denominator (or metrics associated therewith) of the correlation coefficient representing a correlation between the first and the second row vectors of a coefficient matrix, e.g., an LMS-adapted inverse Jones matrix. In embodiments, the numerator exceeding by a pre-determined amount a metric that represents the denominator may be representative of a correlation that is indicative of a predetermined fraction being exceeded. Such metric may comprise a product of anti-diagonal elements that exceed a product of main diagonal elements associated with the coefficient matrix. In embodiments, excessive correlation indicates a possible misconvergence and is used to trigger a reset to an LMS algorithm.

Figure 7:
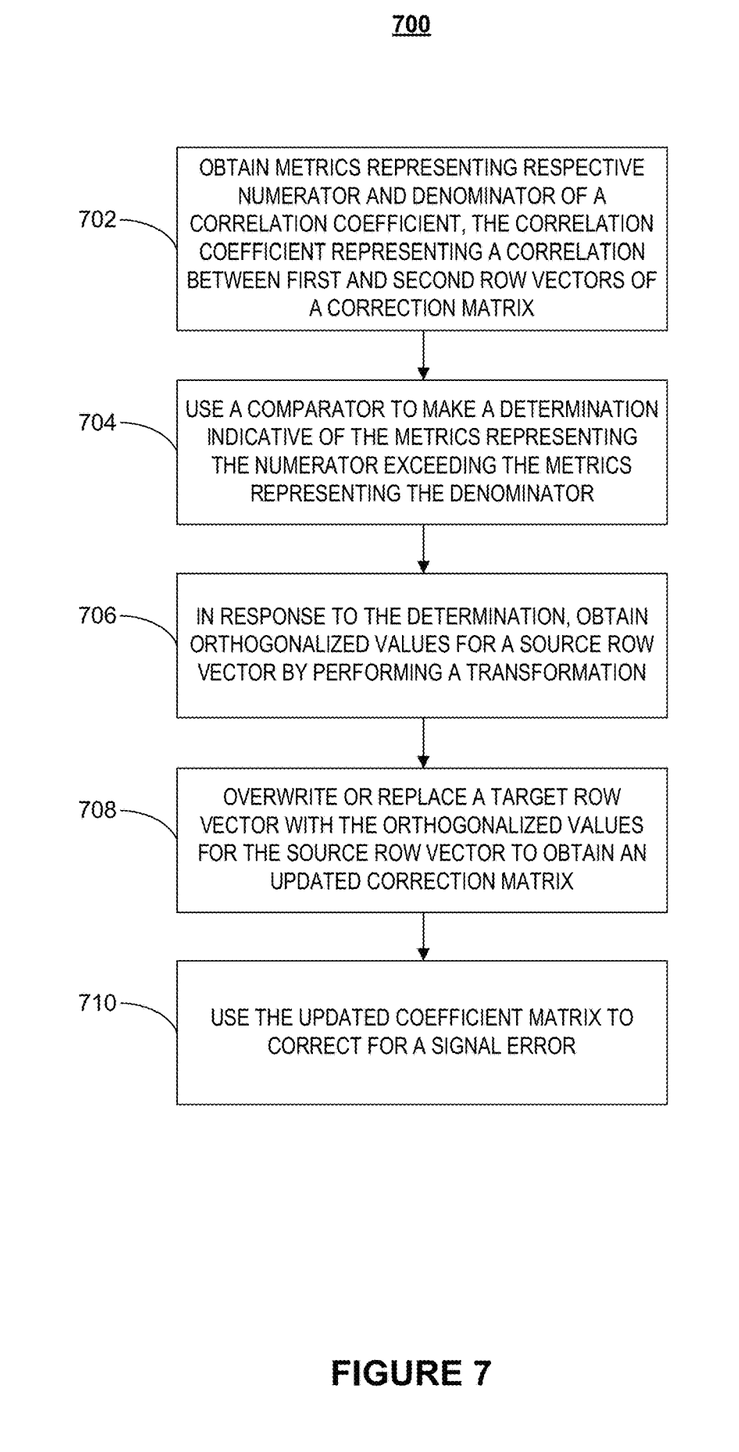
FIG. 7 is a flowchart of an illustrative process for preventing unwanted duplication of polarization signals in coherent receivers, according to embodiments of the present disclosure.

FIG. 7 is a flowchart of an illustrative process for preventing unwanted duplication of polarization signals in coherent receivers, according to embodiments of the present disclosure. In embodiments, process 700 begins at step 702 when metrics representing respective numerator and denominator of a correlation coefficient are obtained. The correlation coefficient may represent a correlation between first and second row vectors of a correction matrix.

At step 704, use a comparator to make a determination indicative of the metrics representing the numerator exceeding the metrics representing the denominator.

At step 706, in response to the determination, orthogonalized values may be obtained for a source row of the coefficient matrix by performing a transformation.

At step 708, a target row of the coefficient matrix may be overwritten or replaced with orthogonalized values for the source row of the coefficient matrix to obtain an updated correction matrix.

Finally, at step 710, the updated coefficient matrix may be used to correct for a signal error.

In various embodiments, a first set of coefficients that is associated with a first signal stream and a second set of coefficients that is associated with a second signal stream may be obtained. In response to the first and second set of coefficients satisfying a condition, the first set of coefficients may be transformed into a modified set of coefficients that are mutually orthogonal with respect to the second set of coefficients. The second set of coefficients may then be replaced with the modified set of coefficients to obtain a series of coefficient value that may be used to perform source separation of independent signal streams without duplicating one of the independent signal streams.

It is noted that (1) certain steps may optionally be performed, (2) steps may not be limited to the specific order set forth herein, (3) certain steps may be performed in different orders, and (4) certain steps may be done concurrently.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using Application Specific Integrated Circuits (ASICs), programmable arrays, digital signal processing circuitry, or the like. Accordingly, the terms in any claims are intended to cover both software and hardware implementations. The term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for preventing duplication of polarization signals in a coherent receiver, the method comprising:
   in response to receiving a first set of coefficients and a second set of coefficients, replacing the second set of coefficients with a modified set of coefficients that are mutually orthogonal with respect to the second set of coefficients to obtain an updated set of coefficient values; and
   using the updated set of coefficient values to perform source separation of a plurality of independent signal streams without duplicating one of the plurality of independent signal streams.

2. The method according to claim 1, wherein the source separation prevents output signals from converging to substantially a same solution thereby preventing the coherent receiver from outputting a same polarization component of a signal.

3. The method according to claim 1, further comprising using a correlation coefficient that is defined by a nominator and a denominator, the correlation coefficient representing a correlation between the first set of coefficients and the second set of coefficients.

4. The method according to claim 3, wherein the first set of coefficients and the second set of coefficients satisfy a condition that comprises a metric representing a numerator of the correlation coefficient exceeding a fraction of a metric representing the denominator of the correlation coefficient.

5. The method according to claim 4, wherein the first set of coefficients represents a first row vector and the second set of coefficients represents a second row vector of a coefficient matrix.

6. The method according to claim 5, wherein the coherent receiver uses the coefficient matrix as a time-varying demixing matrix in an adaptive feedback control loop to perform the source separation.

7. The method according to claim 5, wherein the first row vector is represented by two complex numbers and wherein the modified set of coefficients is obtained by a transformation that transforms the first set of coefficients into a modified set of coefficients that are mutually orthogonal, the transformation comprising steps comprising:
   reversing an order of the two complex numbers;

taking conjugates of the two complex numbers to obtain two conjugated numbers; and negating one of the two conjugated numbers.

8. The method according to claim 7, wherein the coefficient matrix is transformed to a nearest unitary matrix.

9. The method according to claim 5, wherein the metric representing the denominator comprises a product of anti-diagonal elements exceeding a product of main diagonal elements associated with the coefficient matrix.

10. The method according to claim 9, wherein the coefficient matrix is a complex coefficient matrix that represents a 2×2 composite polarization and phase matrix that comprises two complex coefficients in each row.

11. A unitary forcer circuit for preventing duplication of polarization signals in a coherent receiver, the circuit comprising:

an input to receive a first set of coefficients and a second set of coefficients;

a sum-of-conjugate circuit coupled to the input, the sum-of-conjugate circuit performing a sum-of-conjugate operation; and a detection circuit coupled to the sum-of-conjugate circuit, the detection circuit performing steps comprising:

replacing the second set of coefficients with a modified set of coefficients that are mutually orthogonal with respect to the second set of coefficients to obtain an updated set of coefficient values; and using the updated set of coefficient values to perform source separation of a plurality of independent signal streams without duplicating one of the plurality of independent signal streams.

12. The circuit according to claim 11, wherein the source separation prevents output signals from converging to substantially a same solution thereby preventing the coherent receiver from outputting a same polarization component of a signal.

13. The circuit according to claim 11, wherein the input is generated by a polarization control loop that comprises a quantizer that transforms a coefficient matrix to a nearest unitary matrix and that continuously updates a correction matrix.

14. The circuit according to claim 11, further comprising a correlation coefficient representing a correlation between the first set of coefficients and the second set of coefficients.

15. The circuit according to claim 14, wherein the detection circuit makes a determination whether the first and second set of coefficients satisfy a condition comprising a metric representing a numerator of the correlation coefficient exceeding a fraction of a metric representing a denominator of the correlation coefficient, the first set of coefficients representing a first row vector and the second set of coefficients representing a second row vector of a coefficient matrix.

16. The circuit according to claim 15, wherein the coefficient matrix is a demixing matrix that is time-varying and is used to perform the source separation.

17. The circuit according to claim 15, wherein a duplication comprises causing the coefficient matrix to become one of a non-unitary Jones matrix or its inverse.

18. The circuit according to claim 15, wherein the metric representing the denominator comprises a product of anti-diagonal elements exceeding a product of main diagonal elements associated with the coefficient matrix.

19. The circuit according to claim 18, wherein coefficients of the coefficient matrix are implemented in a set of analog integrators that define one or more states of a Jones matrix.

20. The circuit according to claim 19, wherein at least one of the set of analog integrators is set to values that cause the Jones matrix to become unitary.

* * * * *